July 8, 1924.
E. G. DANN
1,500,375
SPRING BUMPER FOR MOTOR VEHICLES
Filed Dec. 14, 1922
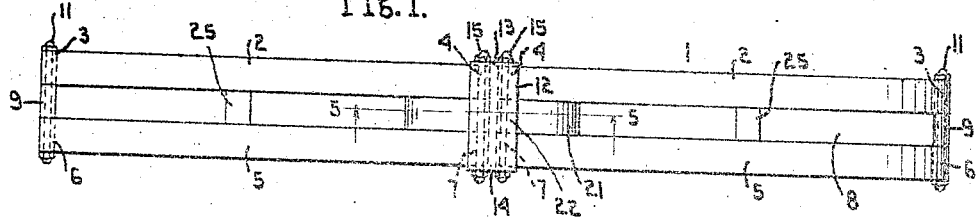
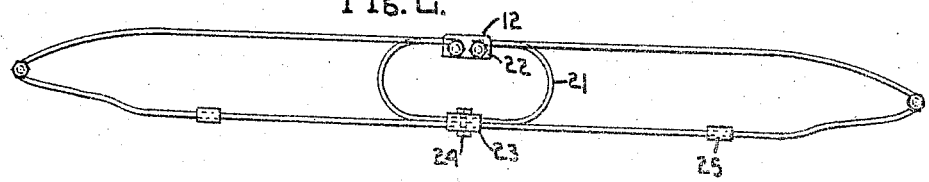
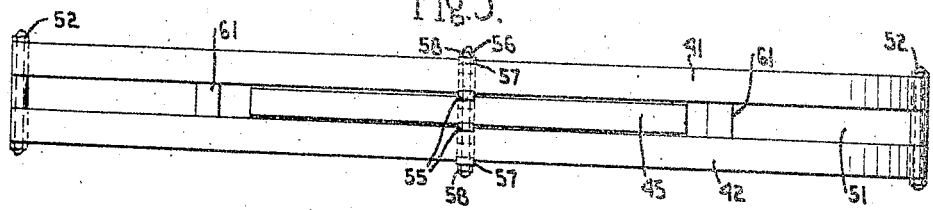
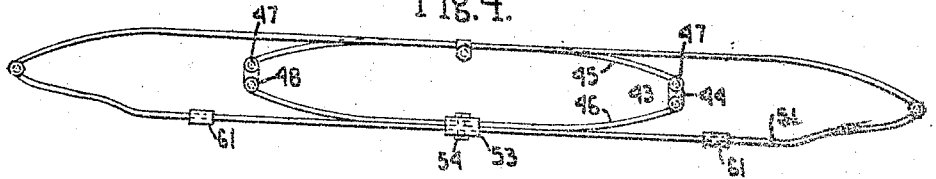
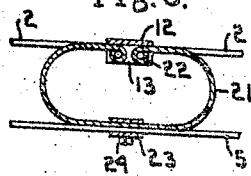
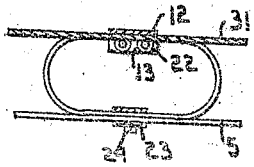
INVENTOR.
Ernest G. Dann
BY
*Ray Oberlin & Ray*
ATTORNEYS Patented July 8, 1924.

1,500,375

UNITED STATES PATENT OFFICE.

ERNEST G. DANN, OF CHICAGO, ILLINOIS.

SPRING BUMPER FOR MOTOR VEHICLES.

Application filed December 14, 1922. Serial No. 606,795.

*To all whom it may concern:*

Be it known that I, ERNEST G. DANN, a citizen of the United States, and a resident of Chicago, county of Cook, and State of Illinois, have invented a new and useful Improvement in Spring Bumpers for Motor Vehicles, of which the following is a specification, the principle of the invention being herein explained and the best mode in which I have contemplated applying that principle, so as to distinguish it from other inventions.

This invention comprises a spring bumper for motor vehicles. More particularly it relates to a bumper wherein a plurality of impact bars of spring material are associated with one or more supporting elements of spring material and adapted to be secured to the ends of the frame of an automobile, or its associated members, by means of brackets of any desired form.

Spring bumpers, as heretofore constructed, ordinarily are formed of members of considerable length and not infrequently have integral transverse extensions for attaching them to the supporting parts of the automobile. In practically all of such bumpers special machinery is required to form the various structural elements and such bumpers, when assembled, are found to be insufficiently resistant to impact applied centrally of the bumper structure.

The present invention has for its object the improvement of spring bumper devices so as to make them both more economical of manufacture and more resistant to the shocks they are designed to withstand. It is also an object of the invention to permit a bumper to be assembled of either one length or one-half length impact bars. A further feature of the invention is to provide an independent resilient unit to be interposed centrally of the bumper to absorb and distribute shocks impressed upon the bumper over a fairly wide central area, thus making the bumper in effect of substantially uniform resistance to impact across its entire impact area. Other objects of the invention will appear in the course of the following description. To the accomplishment of the foregoing and related ends, said invention, then, consists of the means hereinafter fully described and particularly pointed out in the claims.

The accompanying drawing and the following description set forth in detail certain mechanism embodying the invention, such disclosed means constituting, however, but one of various mechanical forms in which the principle of the invention may be used.

In said accompanying drawing:—

Fig. 1 is a front elevation of the improved bumper wherein an integral central resilient unit is employed; Fig. 2 is a plan view of the bumper shown in Fig. 1 as seen from below; Fig. 3 is a modified form of bumper wherein a full-elliptic spring is employed as the central resilient unit; Fig. 4 is a plan view of the bumper shown in Fig. 3 as seen from below; Fig. 5 is a detail sectional view taken along the line 5—5 shown in Fig. 1, looking in the direction of the arrows; and Fig. 6 is a detail sectional view similar to Fig. 5 but showing a modified form of bumper wherein the main impact bars are continuous entirely across the bumper instead of having all one-half length, as shown in Fig. 5.

In the form of the device illustrated in Figs. 1 and 2, the bumper 1 comprises a plurality of impact bars in parallel and longitudinal alignment with each other. The upper impact bars 2 are provided with spring eyes 3, 4, at their outer and inner ends, respectively, and the lower impact bars 5 have similar spring eyes 6, 7, at their outer and inner ends, respectively. A supporting bar 8 of approximately twice the length of the individual impact bars is provided at its ends with spring eyes 9 and in the assembled bumper is adapted to be positioned between the outer ends of the upper and lower impact bars, being held in position by means of bolts 11 extending through the spring eyes of the several bars referred to. The two upper and the two lower impact bars are placed in longitudinal alignment and are held in such position by means of a central plate 12, having rearwardly extending top and bottom flanges 13, 14, suitably apertured to receive a pair of parallel center bolts 15.

In the assembled bumper an integral resilient unit 21, formed of a spring-metal strip bent to approximately elliptical shape, having rounded ends and flattened side portions, is provided at its ends with spring eyes 22 by means of which it is adapted to be held in operative relation with the spring eyes on the inner ends of the several impact bars. This is accomplished by sleeving the respective spring eyes over the center bolts 15 prior to applying the nuts or fastening elements upon the ends of said bolts. It will be noted that the plate 12 overlies a portion of the front face of each of the impact bars as well as the resilient unit and serves to maintain the several impact bars in transverse alignment. The central impact unit is firmly clamped to the central portion of the supporting bar 8 by means of a U-shaped clamp 23 held in adjusted position by means of a bolt 24 across its free ends. The supporting bar is adapted to be attached to the frame ends of an automobile by means of brackets 25 of any desired type.

The details of the construction of the central resilient unit just described are more clearly shown in Fig. 5 of the drawing. In Fig. 6, however, in place of positioning two impact bars in longitudinal alignment, in each of the upper and lower impact members of the bumper, but a single impact bar extending the entire length of the bumper is employed in each instance. These impact bars are identical in shape, whether used as the upper or lower impact bars of the bumper, and only the upper bar 31 is illustrated in Fig. 6. The other elements of the construction are identical with the parts shown in Figs. 1, 2, and 5.

In Figs. 3 and 4 is illustrated a modified form of the bumper wherein both the upper and lower impact bars 41, 42, extend entirely across the impact area and wherein the central resilient unit 43 employed is of the shape of the universal full elliptic spring used in vehicle construction. The spring, however, has shackles 44 connecting each of its leaf sections 45, 46, by means of conventional spring bolts 47 extending through spring eyes 48 formed at the ends of each of said spring leaf sections.

The modified form of bumper is assembled in approximately the same manner as the bumper illustrated in Figs. 1 and 2, having a supporting bar 51 provided with terminal spring eyes interposed between the impact bars and held in operative relation therewith by means of the end bolts 52 of the bumper. The spring leaf 46 of the central resilient unit is connected centrally with the supporting bar 51 by means of a U-shaped clamp 53 of the type heretofore described, having a fastening bolt 54. The forward leaf 45 of the central resilient unit is adapted to extend centrally between the upper and lower impact bars and is held in operative relation to the same by means of a series of fastening elements 55 sleeved upon a center bolt 56. Additional fastening elements 57 are sleeved upon the ends of the bolt 56 in a position to clamp the upper and lower edges of the respective impact bars. By turning the nuts 58, or other fastening elements, upon the ends of the center bolt the hook-shaped portions of the attaching elements sleeved upon the bolt 56 will be caused to grip firmly the edges of both of the impact bars, as well as the interposed leaf of the central resilient unit. The supporting bar 51 of the bumper is adapted to be attached to the frame ends, or some similar portion of an automobile, by means of brackets 61 of any suitable design.

In the type of bumper first described, it will be noted the impact bars are of identical shape and of approximately one-half the usual length of the bars customarily employed in bumpers having hinged ends, and that the central resilient unit is a part of relatively small size and capable of being shipped with the other elements of the bumper in knockdown form in a shipping case much smaller than the usual dimensions. These parts are likewise capable of being manufactured in plants equipped to produce vehicle springs of the standard lengths and require no special machinery for the manufacture. The supporting bars, while of approximately twice the length of the impact bars, are of simple design and likewise offer no great manufacturing difficulties.

In the type of bumper shown in Figs. 3 and 4, both the impact bars and the supporting bar are of approximately equal length, although of slightly different curvature at their respective ends. The impact bars in this form of the device may be substituted for those shown in Figs. 1 and 2 in accordance with the disclosure in Fig. 6, the central resilient unit being identical with that in the form of the device first described.

The central resilient unit employed in the modified form of bumper shown in Figs. 3 and 4 is of greater lateral extent than that shown in the other figures of the drawing. It is also formed of a pair or resilient elements such as are usually produced at a plant manufacturing vehicle springs and may be produced in quantities with the usual machinery. It also readily lends itself to shipment in knockdown form and when assembled in the bumper presents a central element which is very effective in distributing shocks applied centrally to the bumper over a wide area.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In an article of the character described, the combination of a resilient impact bar, a supporting bar of spring material pivotally connected at its ends with said impact bar, a unit of spring material, and means for attaching said unit to said impact bar and said supporting bar at central points, respectively.

2. In an article of the character described, the combination of a plurality of impact bars of spring material extending transversely and spaced in parallel relation to each other, supporting means interposed between said impact bars adjacent their ends and pivotally connected therewith, and an auxiliary resilient unit interposed between said impact bars and attached at central points to said impact and supporting bars.

3. In an article of the character described, the combination of a plurality of impact bars of spring material extending transversely and spaced in parallel relation to each other, a supporting bar having its ends interposed between said impact bars adjacent their ends pivotally connected thereto, and an auxiliary resilient unit connected centrally to said supporting bar and interposed between and connected to said impact bars centrally of said structure.

Signed by me, this 5th day of December, 1922.

ERNEST G. DANN.